United States Patent [19]

Foltz, Jr. et al.

[11] Patent Number: 5,179,919
[45] Date of Patent: Jan. 19, 1993

[54] WIRE LOOM MOUNTING

[75] Inventors: Gilbert H. Foltz, Jr., Mesa; Stephen A. Harding, Chandler, both of Ariz.

[73] Assignee: Mr. Gasket Company, Cleveland, Ohio

[21] Appl. No.: 789,666

[22] Filed: Nov. 8, 1991

[51] Int. Cl.⁵ .................. H02G 3/26; F02P 1/00; F02P 23/00
[52] U.S. Cl. .................. 123/143 C; 123/169 PA; 174/72 A
[58] Field of Search ........... 123/143 C, 169 PA, 647; 174/72 A

[56] References Cited

U.S. PATENT DOCUMENTS

| | | |
|---|---|---|
| 1,619,991 | 3/1927 | Smarr . |
| 2,997,531 | 8/1961 | Oldham et al. ............ 174/72 A |
| 3,342,168 | 9/1967 | Burdette ............ 123/143 C |
| 4,494,520 | 1/1985 | Hurwitz ............ 174/72 A |
| 4,771,743 | 9/1988 | McDowell ............ 123/143 C |
| 5,046,464 | 9/1991 | Hisatomi et al. ............ 123/143 C |

Primary Examiner—Willis R. Wolfe
Attorney, Agent, or Firm—Charles E. Cates

[57] ABSTRACT

An improvement in a wire loom mounting provides an appendage on a header flange, a non-circular aperture in the appendage, an insert keyed to fit the non-circular aperture, and means for mounting wire loom structures on the insert.

6 Claims, 1 Drawing Sheet

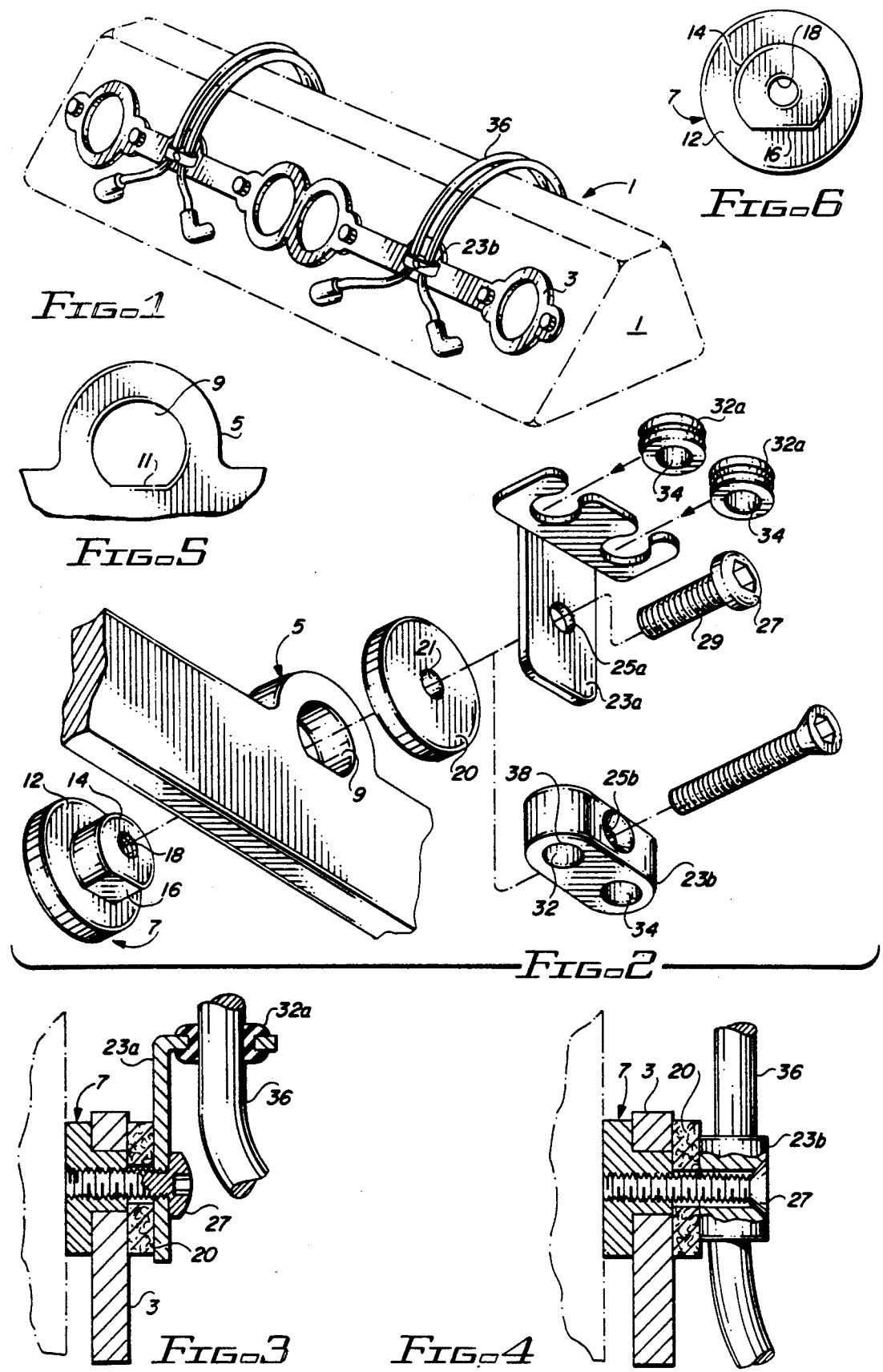

WIRE LOOM MOUNTING

This invention relates to improvements in wire loom supports for motor vehicle engines.

BACKGROUND OF THE INVENTION

Wire looms are designed to support ignition wires away from the adjoining headers, heads and valve cover to prevent heat damage. In the prior art it was accomplished by adapting the base of the loom to mounting on some of the bolts that secure the valve cover to the cylinder head or the engine block, requiring the removal from the cover of the necessary number of bolts which were inserted in holes in the bases of the looms and reinstalled in place in the cylinder head on the engine block The U.S. Pat. No. 1,619,991 to Smarr, is an early U.S. Pat. for a wire loom supported by a standard fastened to an engine by a valve cover bolt. Also, Burdette, U.S. Pat. No. 3,342,168 supports a cable harness by means of a support fastened to the valve cover. U.S. Pat. No. 4,771,743 to McDowell refers to a typical wire loom bracket as rigidly attached to the engine block or valve cover. In addition to the inconvenience involved in installation the apparatus permitted the looms to swivel on their seats. Eventually, a wire would touch a hot header and melt its insulation, causing a short in its associated ignition circuit. This invention was conceived to solve those problems.

BRIEF SUMMARY OF THE INVENTION

Briefly, the invention lies in the provision of one or more tabs or projections on each of a set of header flanges which have non-circular apertures (one or more in number). An insert is sized to fit the tab apertures and has a rim or other means on one end of the insert that serves as a detent or retainer to prevent the insert's slipping through the aperture. The insert is tapped to receive a threaded bolt which secures the base of a loom to the insert. The mating, non-circular geometry of the aperture and insert combination prevents rotation of the base and its associated loom. A heat-resistant, insulating spacer is used to inhibit the transfer of heat from the flange to the wire loom. The loom accepts most of the standard ignition wire holders found on the market.

BRIEF DESCRIPTION OF THE DRAWINGS

The drawings represent a presently preferred embodiment of the invention.

FIG. 1 is a perspective view of a device, according to the invention, mounted on a cylinder head;

FIG. 2 is an exploded view of FIG. 1;

FIG. 3 is a side elevation, in section, of FIG. 2;

FIG. 4 is a side view of FIG. 1 in an alternative embodiment to FIG. 3;

FIG. 5 is a plan view of a portion of the embodiment of FIG. 1, greatly enlarged; and FIG. 6 is a plan view of the insert to FIG. 5.

DETAILED DESCRIPTION OF THE INVENTION

FIG. 1 shows the presently preferred best mode of practicing the invention. Mounted on a cylinder head 1 is a header flange 3 which is provided with two tabs 5 (best seen in FIG. 2). Tabs 5 have apertures 9 which are non-circular, in this case having a flat chord 11. The apertures 9 receive the crown 14 of hat-shaped insert 7. The crown 14 has a flat side 16 to make a matching pattern to aperture 9 so that crown 14 will not rotate in aperture 9.

Two embodiments are shown in FIG. 2 wherein the crown 14 of insert 7 fits into aperture 9 in tab 5. An insulated spacer 20 and wire loom 23a (or 23b) are positioned to register tapped bore 18, bores 21 and 25a (or 25b) to receive the shank 29 of machine screw 27.

The wires 36 are held fast by wire holders 32a (or 32b). Thus the wires are securely held against rotation and spaced from the engine block and headers (not shown).

The insulating head-resistant spacer 20 is important to protect the wire loom 23a, 23b from heat transfer that would be conducted to and damage the wire insulation.

What is claimed is:

1. The combination of a cylinder head, a header seated on said cylinder head, a header flange body disposed between said cylinder head and said header and having at least one projection from said flange body, a non-circular aperture in said projection and means for attaching an ignition wire loom to said aperture.

2. The combination of claim 1 wherein said means for attaching an ignition wire loom to said aperture comprises an insert keyed to fit said aperture and means for attaching said insert to said loom.

3. The combination of claim 2 wherein said means for attaching said insert to a loom comprise a tapped bore in said insert, a base to said loom, a bore in said base, and a bolt inserted through said base bore and screwed into said tapped bore.

4. The combination of claim further comprising an insulated spacer disposed between said insert and said loom.

5. The combination of claim 2 further comprising an insulated spacer disposed between said insert and said loom.

6. The combination of claim 3 further comprising an insulated spacer disposed between said insert and said loom.

* * * * *

UNITED STATES PATENT AND TRADEMARK OFFICE
CERTIFICATE OF CORRECTION

PATENT NO. : 5,179,919
DATED : January 19, 1993
INVENTOR(S) : Foltz, Jr., et. al.

It is certified that error appears in the above-indentified patent and that said Letters Patent is hereby corrected as shown below:

Column 2, Claim 4, line 46, --1-- is inserted between "claim" and further".

Signed and Sealed this

Ninth Day of November, 1993

Attest:

BRUCE LEHMAN

Attesting Officer     Commissioner of Patents and Trademarks